United States Patent [19]
Moribe et al.

[11] Patent Number: 4,604,663
[45] Date of Patent: Aug. 5, 1986

[54] FLOPPY DISK DRIVER

[75] Inventors: Yoshihiro Moribe, Chigasaki; Nobukuni Ohkubo, Kanagawa; Mikio Takahashi; Kazuo Nakagoshi, both of Odawara, all of Japan

[73] Assignee: Hitachi, Ltd., Tokyo, Japan

[21] Appl. No.: 707,033

[22] Filed: Mar. 1, 1985

[30] Foreign Application Priority Data

Mar. 5, 1984 [JP] Japan .................. 59-40328

[51] Int. Cl.⁴ ............................ G11B 19/26
[52] U.S. Cl. ...................................... 360/73
[58] Field of Search ..................... 360/71, 73

[56] References Cited
U.S. PATENT DOCUMENTS 4,376,293 3/1983 Teramura ................. 360/71
4,547,820 10/1985 Saito ........................ 360/71

FOREIGN PATENT DOCUMENTS 58-158075 9/1983 Japan ..................... 360/73

OTHER PUBLICATIONS

*Research Disclosure*, Nov. 1984, No. 247, #24736, Disk File Soft Starting, (Controlled Initial Acceleration), anonymous, Kenneth Mason Publications Ltd., England.

Primary Examiner—George G. Stellar
Attorney, Agent, or Firm—Antonelli, Terry & Wands

[57] ABSTRACT

A floppy disk driver intended to protect the disk center hole from damage when the disk is mounted. The arrangement includes a speed detection circuit for detecting a relatively low rotational speed of the disk and a control circuit for speeding up the disk to a higher rotational speed for the read/write operation in response to the detection of the lower disk speed, whereby the disk is protected from damage by being rotated at the lower speed when its center hole is held between the collet and spindle.

11 Claims, 5 Drawing Figures

FLOPPY DISK DRIVER

BACKGROUND OF THE INVENTION

The present invention relates to a floppy disk driver and, particularly, to a floppy disk driver intended to protect a floppy disk from damage and wear when it is mounted on the driver.

Generally, when a floppy disk is mounted on a floppy disk driver by being inserted between the spindle and collet, the center hole of the disk is caught by the rotating spindle and the collet so that the disk is centered by being guided at its center hole along the tapered circumferential surface of the collet. The reason for turning the spindle during the centering operation is to prevent the deformation and damage at the edge of the center hole of the pliable floppy disk.

However, in the conventional floppy disk driver, when a floppy disk is mounted or inserted with its spindle kept turning, there is a possibility that the turning spindle strongly hits the edge of the disk center hole, causing damage to the edge of the hole.

There are proposals for protecting the floppy disk from damage during the mounting operation as described, for example, in U.S. Pat. Nos. 4,409,629 and 4,413,294, in which the collet is first moved laterally so that it fits in the disk hole and then the collet is positioned to the spindle. These floppy disk drivers, however, result in a complex structure.

SUMMARY OF THE INVENTION

The primary object of the present invention is to provide a floppy disk driver capable of centering a floppy disk without damaging the edge of the disk center hole when the disk is mounted on the driver.

The second object of the invention is to provide a high-speed floppy disk driver operable to protect the disk center hole from damage during the information read/write operation.

The third object of the invention is to provide a floppy disk driver which does not start the spindle rotation unless the floppy disk is inserted correctly, thereby preventing the disk hole from being clamped in a misalignment condition, whereby the disk center hole is protected from damage.

In order to achieve the above objects, the inventive floppy disk driver features to operate at a lower spindle speed during the disk holding operation, noting or based on the fact that the disk hole is less susceptible to damage when it is handled at a relatively low spindle speed.

More particularly, the invention resides characteristically in a floppy disk driver which is provided with a speed detection means for detecting that the floppy disk held between the collet and spindle has reached the first rotational speed, and a control circuit for operating the spindle motor at the second rotational speed faster than the first speed in response to the detection of the first disk speed by the speed detection means. The inventive floppy disk driver further features to initiate the spindle rotation when the floppy disk is held between the collet and spindle, or after the floppy disk has been inserted to the specified position.

DESCRIPTION OF THE PREFERRED EMBODIMENTS

Figure 1:
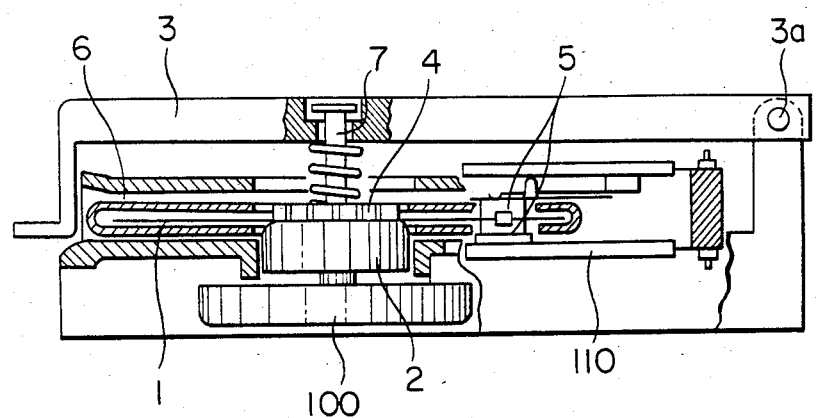
FIG. 1 is a cross-sectional view of a floppy disk driver with a floppy disk held therein.

An embodiment of the present invention will now be described with reference to the drawings. In FIG. 1 showing the structure of a floppy disk driver to which this invention is suitably applied, a floppy disk is made up of a magnetic recording disk 1 enclosed in a square envelope-shaped protection case 6, and it is held by being clamped at its center hole between a spindle 2 driven by a motor 100 and a confronting collet 4. While the recording disk 1 is rotated by the motor 100, information is read or written on it through the seek operation of a pair of magnetic heads 5 implemented by the movement of a carriage 110.

The collet 4 is fixed through a collet shaft 7 on a swing arm 3, and when the floppy disk is mounted or removed, the swing arm is raised or lowered so that the collet 4 holds or releases the recording disk 1 in cooperation with the spindle 2. The carriage movement mechanism does not directly concern the present invention and it is not shown in the figure, and such a mechanism as disclosed in U.S. Pat. No. 4,161,004 may be employed.

Figure 2:
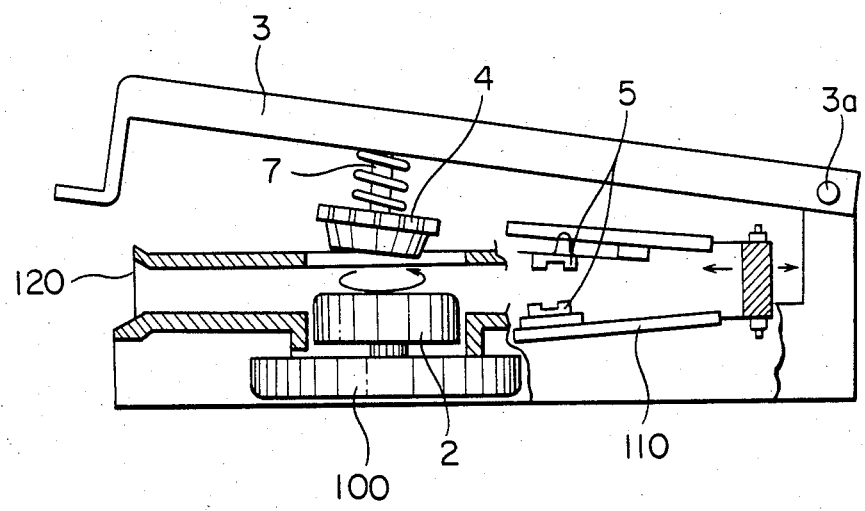
FIG. 2 is a cross-sectional view of the floppy disk driver in a state before a floppy disk is mounted.

In mounting a floppy disk in the floppy disk driver, the swing arm 3 is raised so that the collet 4 is lifted as shown in FIG. 2, and the spindle 2 is rotated with the motor 100. At the same time, the head carriage 110 is opened. In this state, a floppy disk is inserted through the opening 120 and the swing arm 3 is lowered. Then, the recording disk 1 inside the protection case 6 is centered and, at the same time, held between the collet 4 and spindle 2. Thereafter, the magnetic head pair 5 is positioned to a track on the disk 1 for reading or writing information on the track. The circuit arrangement for reading or writing information is disclosed, for example, in U.S. Pat. No. 4,012,785.

Figure 3:
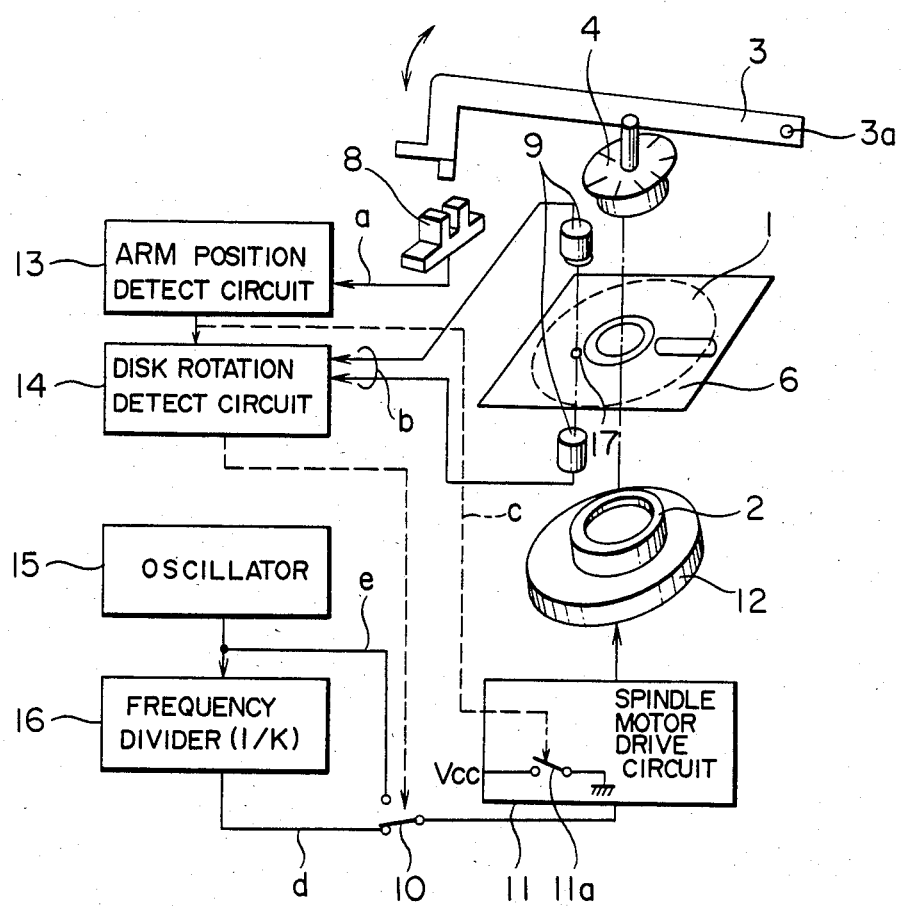
FIG. 3 is a block diagram of the floppy disk driver embodying the present invention, showing the principal mechanism and associated circuit arrangement.

Next, the major electrical and mechanical arrangements of the floppy disk driver embodying the present invention will be described using FIG. 3 in which the same components as those in FIGS. 1 and 2 are referred to by the common symbols. The arrangement includes a sensor 8 made up, for example, of the combination of a light emitting element and a light sensitive element, operating to detect the closed state of the swinging arm 3 pivoted by a pin 3a, a spindle motor drive circuit 11 for controlling the rotation of a spindle motor 12 which has a drive shaft coupled with the spindle 2, and an arm position detecting circuit 13 which receives the output of the sensor 8 and upon detection of the opening of the arm 3 it provides a start signal to the spindle motor control circuit 11 and a disk rotation detection circuit 14. The disk rotation detection circuit 14 responds to the start signal from the arm position detection circuit 13 to count the revolution of the recording disk 1 by receiving the output of a rotation sensor 9 which is made up of the combination of a light emitting element and a light sensitive element for detecting an aperture 17 formed in the recording disk 1. The circuit 14 provides an output to operate a switch 10, which specifies the drive frequency of the sindle motor drive circuit 11 by selecting the output of an oscillation circuit 15 producing a frequency e for the normal disk speed or the output of a frequency divider 16 reducing the output frequency of the oscillation circuit 15 by 1/k so that it is used to produce a lower spindle speed when the floppy disk is mounted as will be described later.

Figure 4:
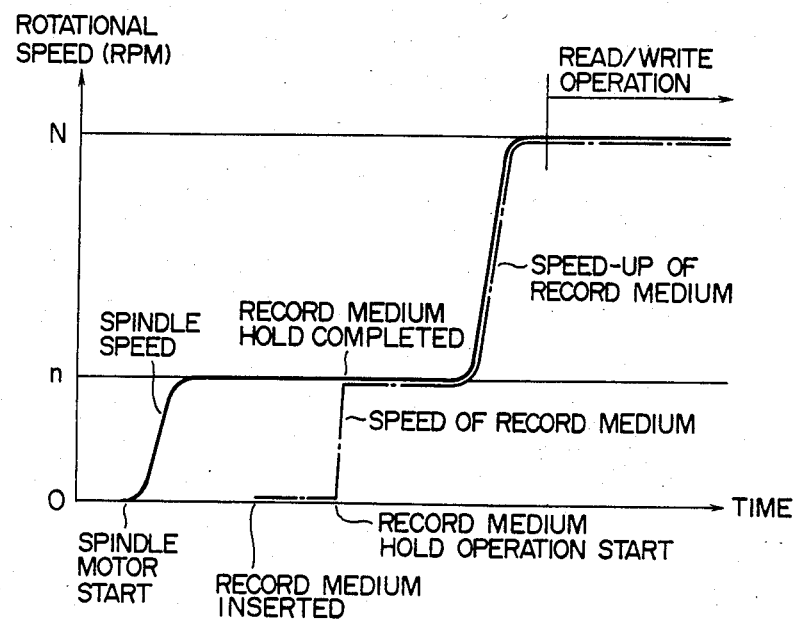
FIG. 4 is a diagram used to explain the spindle speed control implemented with the inventive floppy disk driver.

The operation of the foregoing arrangement will be described with reference to the motor control diagram of FIG. 4.

When power of the floppy disk driver is off and it does not record or reproduce information on the disk, the spindle motor 12 is deactivated. When the arm 3 is raised to mount a floppy disk, it is detected by the optical sensor 8, and the arm position detection circuit 13 operates in response to the output signal a from the sensor 8. The circuit 13 issues a start signal c to the spindle motor drive circuit 11 and disk rotation detection circuit 14. This causes a power switch 11a in the spindle motor drive circuit 11 to close, and the spindle motor 12 starts rotating. At this time, the drive frequency for the spindle motor 12 is set to the output frequency (1/k) of the frequency division circuit 16, and the motor 12 is accelerated to a spindle speed n. The spindle speed n is such a value that the shaft 7 for supporting the collet 4 in the disk hold mechanism is released from the marginal gap formed in the arm 3 (see FIG. 1) and it automatically coincides with the turning center of the spindle 2. The spindle speed n is preferably as low as possible so that a momentary slip between the stationary disk 1 and the turning spindle 2, a slip between the accelerating disk 1 and the collet 4 are both little.

Subsequently, after the arm 3 has been lowered following the insertion of the floppy disk, the recording disk 1 is held between the collet 4 and spindle 2 while being centered automatically by the rotation of the spindle 2. When the holding operation for the recording disk 1 has completed, the rotation sensor 9 produces a pulse signal b, and the disk rotation detection circuit 14 counts the revolution of the disk 1. Upon detection of a disk speed equal to n the disk rotation detection circuit 14 reverses the switch 10, so that the output e from the oscillation circuit 15 is fed to the spindle motor drive circuit 11. Then, the spindle motor 12 is accelerated to a steady-state disk speed N.

After the disk 1 has been held firmly, the spindle motor 12 may be deactivated unless the recording or reproducing operation follows immediately. For commencing the recording or reproducing operation at this state, the spindle motor drive circuit 11 is driven at the output frequency of the oscillation circuit 15 so that the spindle motor 12 is accelerated to the steady-state disk speed N.

For taking out the floppy disk from the floppy disk driver upon completion of the recording or reproducing operation, the arm 3 is raised. In response to this action, the sensor 8 operates to issue the signal a to the arm position detection circuit 13, which then issues the switching signal c to the spindle motor drive circuit 11, thereby turning off power to the drive circuit 11. Then, the spindle motor 12 stops rotating. At the same time, receiving the switching signal c from the arm position detection circuit 13, the disk rotation detection circuit 14 detects the stoppage of the disk 1 and reverses the switch 10 to select the output of the frequency division circuit 16.

As described above, when a floppy disk is mounted, the inventive arrangement operates to drive the recording disk at a speed suitable for holding it, whereby wear at the holding section of the disk or recording medium is reduced and the disk hole is protected from damage. This allows the use of the floppy disk at a higher turning speed, resulting advantageously in a reduction in the search time of the information read write operation, a significant improvement in the information transfer rate, an increase in the number of repetitive use of the recording medium, an increase in the information recording density owing to the enhanced accuracy of holding the recording medium, and a reduction in the power consumption due to the lower spindle speed during the disk holding operation.

The foregoing embodiment is particularly effective as a means for protecting a floppy disk from damage in the mounting operation for the case in the future when the disk speed is increased from the current 300-360 RPM to, for example, 600-720 RPM due to a demand of a higher data transfer rate backed by the higher recording density.

Although in the foregoing embodiment the rotation of the recording disk is initiated in response to the detection of the closing operation of the arm 3, the invention is not limited to this scheme. This point will further be described with reference to FIG. 5.

Figure 5:
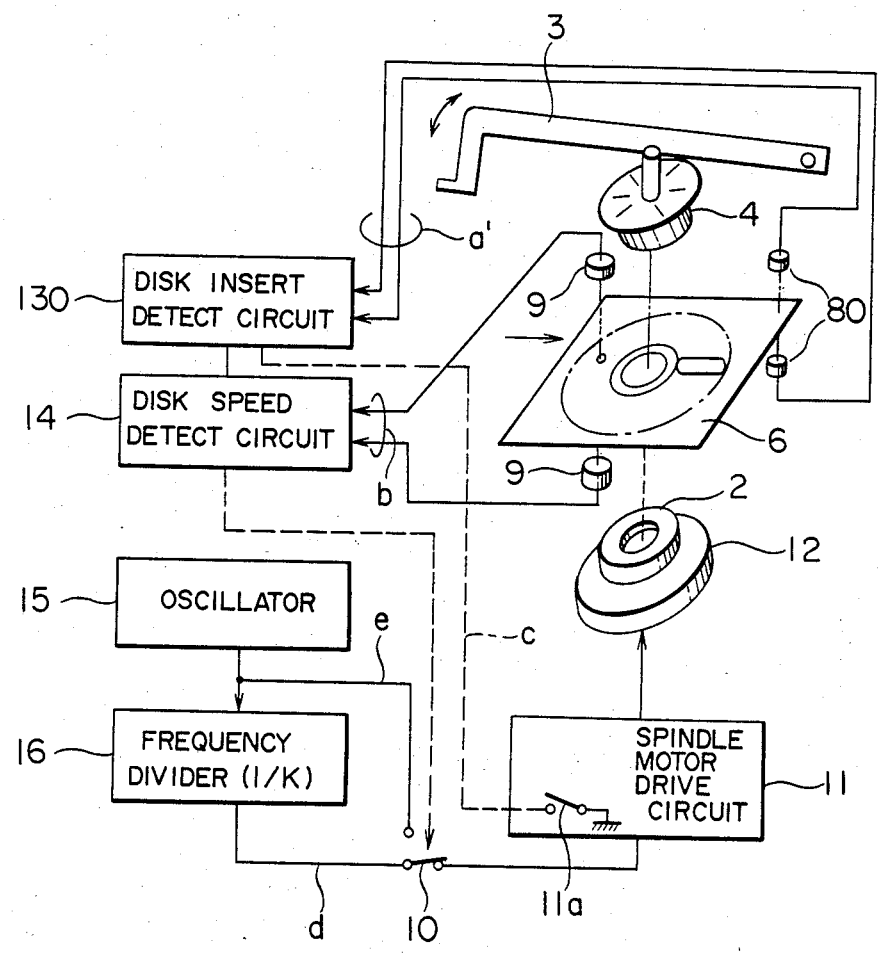
FIG. 5 is a block diagram showing another embodiment of the present invention.

FIG. 5 is the second embodiment of the present invention, showing the major electrical and mechanical arrangement. The new arrangement differs from that of Fig. 3 in that the sensor 8 for detecting the closed state of the arm 3 in FIG. 3 is replaced with a disk insertion sensor 80 for detecting the insertion of a floppy disk 6, and the arm position detection circuit 13 in FIG. 3 is replaced with a disk insertion detection circuit 130. The disk insertion sensor 80 is made up of a light emitting element and a light sensitive element, and it is located in such a place that the light beam from the light emitting element to the light sensitive element is interrupted by an inserted floppy disk at its front edge section, thereby indicating that the center hole of the recording disk 1 registers with or opposes to the collet 4 and spindle 2.

Upon detection of an inserted floppy disk the disk insertion sensor 80 operates on the disk insertion detection circuit 130 to issue a signal c to the spindle motor drive circuit 11, which then drives the spindle motor 12 at the output frequency (1/k) of the frequency division circuit 16. Subsequently, when the arm 3 is closed, the floppy disk 6 is held and rotated, and upon detection of the disk rotation the spindle motor 12 is driven to the higher speed based on the output frequency e of the oscillation circuit 15. These operations are identical to the case of the previous embodiment. In the above operation, the spindle 2 starts rotating in response to the insertion of a floppy disk, causing the recording disk 1 to rotate by the friction. However, in this state the spindle 2 does not yet mesh with the collet 4, and the disk speed does not reach the speed n. Therefore, the rotation detection circuit 14 does not produce the signal c, and the motor speed is kept at n.

This embodiment operates the spindle motor 12 to rotate only when the floppy disk is mounted correctly, allowing the operator to easily confirm that the floppy disk is set correctly.

The foregoing embodiments can be modified in such a way that the spindle motor speed control is implemented by varying the parameter of the oscillator, and it is also possible to control the motor speed in more than two steps.

Although the flexible magnetic disk driver has been described for the illustrative purpose of the present invention, the invention can be applied extensively to any storage unit using a rotary detachable recording medium.

We claim:

1. A floppy disk driver for recording and reproducing data on a recording disk by holding said disk at a center hole thereof between a spindle driven with a motor and a rotatable collet so that said disk is rotated for data recording or reproduction, said floppy disk driver comprising:
   speed detection means for detecting that said recording disk held between said collet and spindle has reached a first rotational speed; and
   a control circuit operating on said motor to speed up from said first rotational speed to a second rotational speed in response to the detection of said first rotational speed of said floppy disk by said speed detection means, said floppy disk driver performing data recording or reproduction while said recording disk rotates at said second rotational speed.

2. A floppy disk driver according to claim 1, wherein said control circuit comprises an oscillator for producing a signal of a certain frequency, a frequency division circuit for reducing the output frequency of said oscillator by 1/k, and a circuit for selecting one of output signals of said oscillator and said frequency division circuit.

3. A floppy disk driver according to claim 2, wherein said first rotational speed ranges from 300 RPM to 360 RPM and said second rotational speed ranges from 600 RPM to 720 RPM.

4. A floppy disk driver for recording and reproducing data on a recording disk by holding said disk at a center hole thereof between a spindle driven with a motor and a rotatable collet so that said disk is rotated for data recording or reproduction, said floppy disk driver comprising:
   access means for bringing said collet close to said spindle so that said collet and spindle eventually mesh with each other;
   access detection means for detecting that said collet has been brought close to said spindle through the operation of said access means;
   speed detection means for detecting that said recording disk held between said collet and spindle has reached a first rotational speed; and
   a control circuit for setting the rotational speed of said motor to said first rotational speed in response to the detection of access of said collet to said spindle by said access detection means, and setting the motor speed to a second rotational speed which is higher than said first rotational speed in response to the detection of said first rotational speed of said recording disk by said speed detection means.

5. A floppy disk driver according to claim 4, wherein said control circuit comprises an oscillator for producing a signal of a certain frequency, a frequency division circuit for reducing the output frequency of said oscillator by 1/k, and a circuit for selecting one of output signals of said oscillator and said frequency division circuit.

6. A floppy disk driver according to claim 4, wherein said access means comprises a pivoted arm which swings open closed, said access detection means detecting a closed state of said arm.

7. A floppy disk driver according to claim 6, wherein said access detection means comprises the combination of a light emitting element and a light sensitive element adapted to detect optically an end section of said arm.

8. A floppy disk driver for recording and reproducing data on a recording disk by holding said disk at a center hole thereof between a spindle driven with a motor and a rotatable collet so that said disk is rotated for data recording or reproduction, said floppy disk driver comprising:
   access means for bringing said collet close to said spindle so that said collet and spindle eventually mesh with each other;
   insertion detection means for detecting that said floppy disk has been inserted to a position at which said center hole confronts said spindle;
   speed detection means for detecting that said recording disk held between said collet and spindle has reached a first rotational speed; and
   a control circuit for setting the rotational speed of said motor to said first rotational speed in response to the detection of insertion of said floppy disk by said insertion detection means, and setting the motor speed to a second rotational speed which is higher than said first rotational speed in response to the detection of said first rotational speed of said recording disk by said speed detection means.

9. A floppy disk driver according to claim 8, wherein said control circuit comprises an oscillator for producing a signal of a certain frequency, a frequency division circuit for reducing the output frequency of said oscillator by 1/k, and a circuit for selecting one of output signals of said oscillator and said frequency division circuit.

10. A floppy disk driver according to claim 8, wherein said access means comprises a pivoted arm which swings open or closed, said insertion detection means detecting an end section of an inserted floppy disk.

11. A floppy disk driver according to claim 10, wherein said insertion detection means comprises the combination of a light emitting element and a light sensitive element confronting said light emitting element, and operates to detect the insertion of a floppy disk when a front end of said floppy disk has entered a space between said light emitting element and light sensitive element.

* * * * *